US011842552B2

(12) United States Patent
Kuraoka

(10) Patent No.: US 11,842,552 B2
(45) Date of Patent: Dec. 12, 2023

(54) VEHICLE EXTERIOR ENVIRONMENT RECOGNITION APPARATUS

(71) Applicant: SUBARU CORPORATION, Tokyo (JP)

(72) Inventor: Minoru Kuraoka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 234 days.

(21) Appl. No.: 17/143,748

(22) Filed: Jan. 7, 2021

(65) Prior Publication Data

US 2021/0279487 A1    Sep. 9, 2021

(30) Foreign Application Priority Data

Mar. 6, 2020  (JP) .................................. 2020-039047
Aug. 7, 2020  (JP) .................................. 2020-135392

(51) Int. Cl.
| | |
|---|---|
| *G06V 20/64* | (2022.01) |
| *G06V 20/58* | (2022.01) |
| *G06V 20/59* | (2022.01) |
| *G06V 10/75* | (2022.01) |

(52) U.S. Cl.
CPC ............ *G06V 20/64* (2022.01); *G06V 10/751* (2022.01); *G06V 20/58* (2022.01); *G06V 20/584* (2022.01); *G06V 20/59* (2022.01); *G06V 20/647* (2022.01)

(58) Field of Classification Search
CPC ...... G06V 20/58; G06V 20/59; G06V 20/647; G06V 10/751; G06V 20/584; G06V 20/64

USPC ......................................................... 382/103
See application file for complete search history.

(56) References Cited

FOREIGN PATENT DOCUMENTS

| | | | | |
|---|---|---|---|---|
| DE | 000019937185 | * | 2/2000 | ........... G01S 17/931 |
| EP | 3115933 A1 | * | 1/2017 | ......... G06K 9/00805 |
| ES | 2299934 | * | 6/2008 | ......... G05B 19/4061 |
| JP | 3349060 B2 | | 11/2002 | |
| KR | 1020150022702 | * | 3/2015 | ............ B60W 30/08 |
| WO | WO2017130639 | * | 3/2017 | ............... G06T 7/20 |
| WO | WO2018070335 | * | 4/2018 | ............... G08G 1/16 |

* cited by examiner

Primary Examiner — Jerome Grant, II
(74) Attorney, Agent, or Firm — Rimon P.C.; Tomoki Tanida

(57) ABSTRACT

A vehicle exterior environment recognition apparatus includes first and second width derivation units, a degree-of-overlap derivation unit, and a specific object determination unit. The first width derivation unit derives a first width of a first three-dimensional object based on a luminance image. The second width derivation unit derives a second width of a second three-dimensional object based on a distance image. The degree-of-overlap derivation unit obtains an overlap width with which the first and second widths overlap horizontally, and set, as a degree of overlap, whichever is greater out of a value obtained by dividing the overlap width by the first width and a value obtained by dividing the overlap width by the second width. The specific object determination unit determines that the first and second three-dimensional objects are an identical specific object, on the condition that the degree of overlap is greater than a predetermined threshold.

13 Claims, 5 Drawing Sheets

VEHICLE EXTERIOR ENVIRONMENT RECOGNITION APPARATUS

CROSS-REFERENCE TO RELATED APPLICATIONS

This application claims priority from Japanese Patent Application Nos. 2020-135392 filed on Aug. 7, 2020, and 2020-039047 filed on Mar. 6, 2020, the entire contents of which are hereby incorporated by reference.

BACKGROUND

The disclosure relates to a vehicle exterior environment recognition apparatus that identifies a specific object present in a traveling direction of an own vehicle.

Techniques have been known that include detecting a preceding vehicle ahead of an own vehicle, to reduce damages by a collision with the preceding vehicle, or to keep a safe inter-vehicular distance to the preceding vehicle. For example, reference is made to Japanese Patent No. 3349060.

SUMMARY

An aspect of the technology provides a vehicle exterior environment recognition apparatus including a first width derivation unit, a second width derivation unit, a degree-of-overlap derivation unit, and a specific object determination unit. The first width derivation unit is configured to derive a first width of a first three-dimensional object on the basis of a luminance image. The luminance image is configured to identify luminance of a target of imaging. The second width derivation unit is configured to derive a second width of a second three-dimensional object on the basis of a distance image. The distance image is configured to identify a distance to the target of imaging. The degree-of-overlap derivation unit is configured to obtain an overlap width with which the first width and the second width overlap in a horizontal direction, and set, as a degree of overlap, whichever is greater out of a value obtained by dividing the overlap width by the first width and a value obtained by dividing the overlap width by the second width. The specific object determination unit is configured to determine that the first three-dimensional object and the second three-dimensional object are an identical specific object, on the condition that the degree of overlap is greater than a predetermined threshold.

An aspect of the technology provides a vehicle exterior environment recognition apparatus including circuitry. The circuitry is configured to derive a first width of a first three-dimensional object on the basis of a luminance image. The luminance image is configured to identify luminance of a target of imaging. The circuitry is configured to derive a second width of a second three-dimensional object on the basis of a distance image. The distance image is configured to identify a distance to the target of imaging. The circuitry is configured to obtain an overlap width with which the first width and the second width overlap in a horizontal direction, and set, as a degree of overlap, whichever is greater out of a value obtained by dividing the overlap width by the first width and a value obtained by dividing the overlap width by the second width. The circuitry is configured to determine that the first three-dimensional object and the second three-dimensional object are an identical specific object, on the condition that the degree of overlap is greater than a predetermined threshold.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
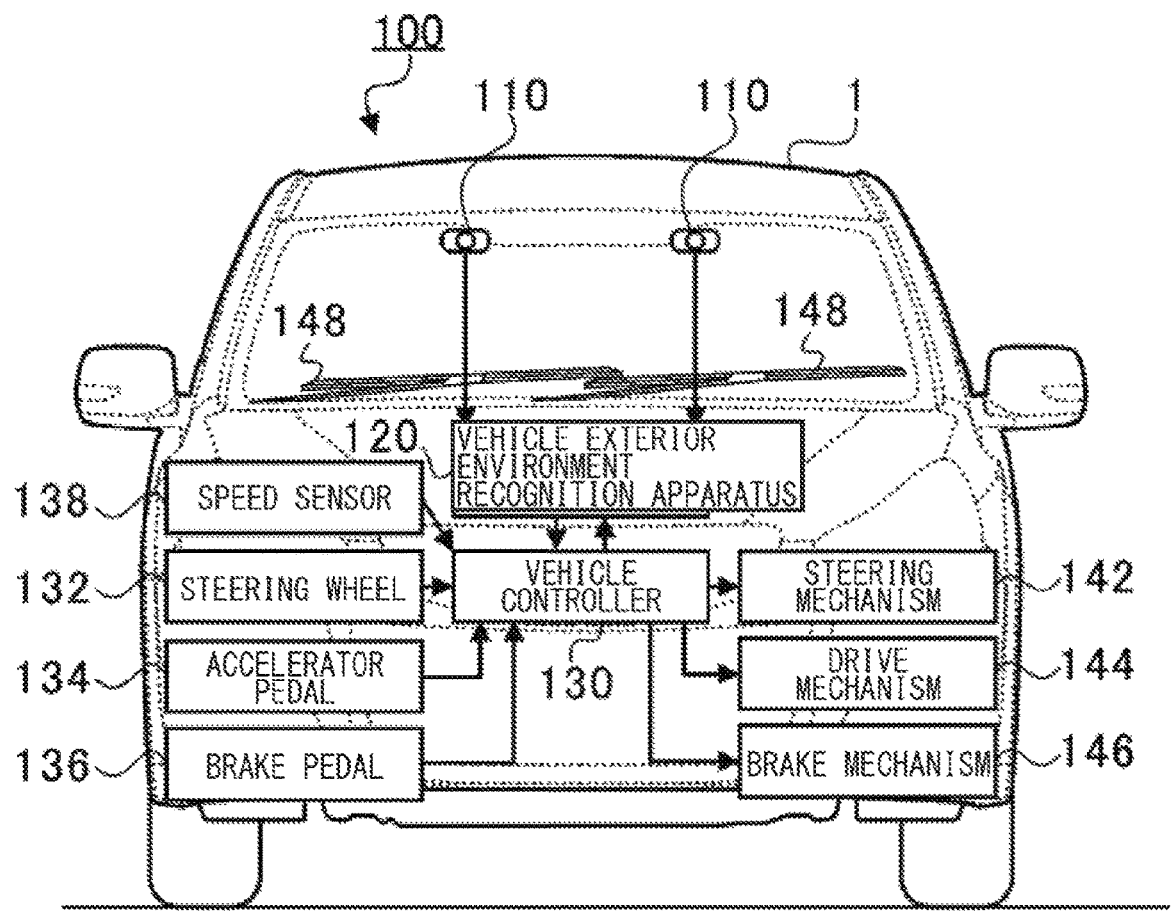
FIG. 1 is a block diagram illustrating a relation of connection in a vehicle exterior environment recognition system.

Reducing damages by a collision of an own vehicle and a preceding vehicle, and providing a follow-up control that includes allowing the own vehicle to follow the preceding vehicle involve determining whether or not a three-dimensional object around the own vehicle is a specific object such as a vehicle. For example, image-capturing units each capture an image of a three-dimensional object, i.e., a luminance image. A shape of the three-dimensional object in the luminance image is recognized to determine that the three-dimensional object is a preceding vehicle. Moreover, a distance image is generated from the luminance images. A relative distance or a speed of the three-dimensional object in the distance image is recognized to determine that the three-dimensional object is a preceding vehicle.

In a case where the three-dimensional object is far away from the own vehicle, however, the three-dimensional object occupies small area in the image. This may cause fluctuation of the shape in the luminance image, or fluctuation of the relative distance in the distance image, contributing to lowered determination accuracy of a specific object.

It is desirable to provide a vehicle exterior environment recognition apparatus that makes it possible to enhance determination accuracy of a specific object.

In the following, some preferred but non-limiting embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

(Vehicle Exterior Environment Recognition System 100)

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller 130. The embodiment may include an example with the two image-capturing units 110 without limitation.

The image-capturing units 110 may each include an imaging device such as, but not limited to, a charge-coupled device (CCD) and a complementary metal-oxide semiconductor (CMOS). The image-capturing units 110 may each capture an image of vehicle exterior environment ahead of an own vehicle 1, and generate a luminance image. The luminance image may include at least luminance information, and be provided in the form of a color image or a monochrome image. The two image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may include a capture of a three-dimensional object present in a detection region ahead of the own vehicle 1.

The vehicle exterior environment recognition apparatus 120 may recognize the vehicle exterior environment, through the luminance images acquired from the image-capturing units 110, and through a distance image based on the two luminance images. On the basis of the vehicle exterior environment recognized, and on the basis of traveling states of the own vehicle 1, the vehicle exterior environment recognition apparatus 120 may make a travel control of the own vehicle 1, e.g., a speed control and a steering angle control. The vehicle exterior environment recognition apparatus 120 is described later in detail.

The vehicle controller 130 may include, for example, an electronic control unit (ECU). The vehicle controller 130 may receive an input of a driver's operation through a steering wheel 132, an accelerator pedal 134, and a brake pedal 136, refer to a speed sensor 138, and transmit the input to a steering mechanism 142, a drive mechanism 144, and a brake mechanism 146, to control the own vehicle 1. The speed sensor 138 may be provided on an axle. The vehicle controller 130 may control the steering mechanism 142, the drive mechanism 144, and the brake mechanism 146 in accordance with an instruction from the vehicle exterior environment recognition apparatus 120. On travel in the rainfall, the vehicle controller 130 may cause a wiper 148 to operate, in accordance with an operation by the driver. The wiper 148 may wipe out dirt and foreign matters on a windshield glass and a rear window glass of the own vehicle 1.

(Vehicle Exterior Environment Recognition Apparatus 120)

Figure 2:
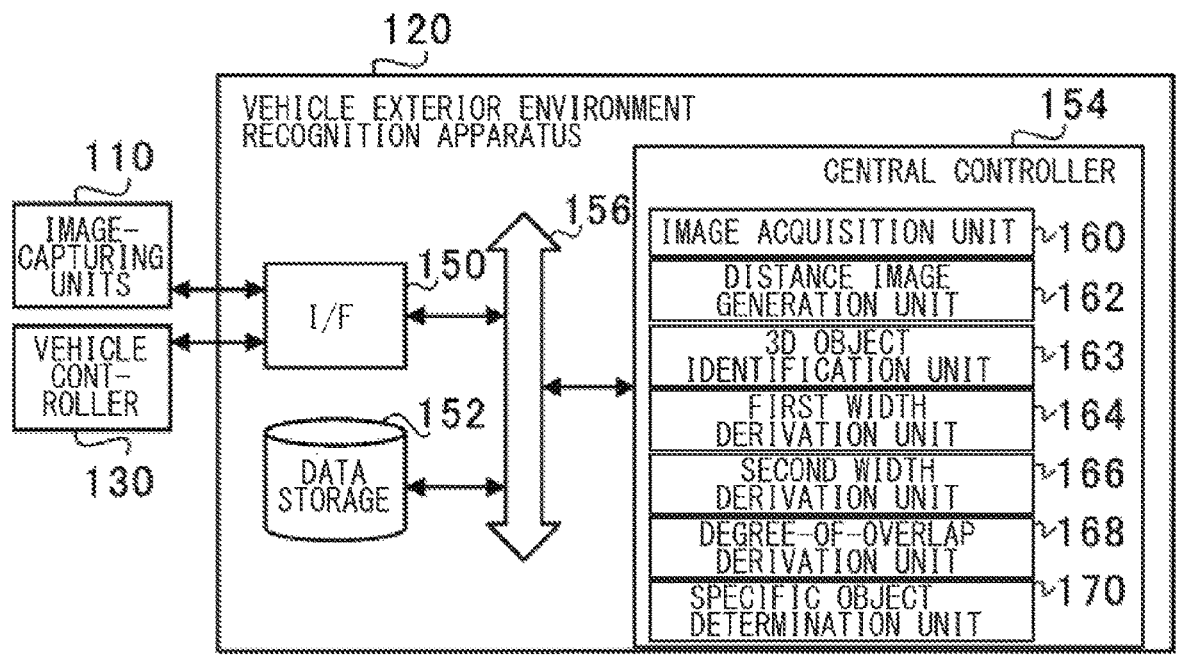
FIG. 2 is a block diagram illustrating, in outline, subunits of a vehicle exterior environment recognition apparatus.

FIG. 2 is a block diagram illustrating, in outline, subunits of the vehicle exterior environment recognition apparatus 120. As illustrated in FIG. 2, the vehicle exterior environment recognition apparatus 120 may include an I/F 150, a data storage 152, and a central controller 154.

The I/F 150 is an interface that carries out bi-directional information exchange with the image-capturing units 110 and the vehicle controller 130. The data storage 152 may include, for example, a RAM (Random Access Memory), a flash memory, and an HDD (Hard Disk Drive), and hold various pieces of information involved in processing by the subunits described below.

The central controller 154 may include a semiconductor integrated circuit including, for example, a CPU (Central Processing Unit), a ROM (Read Only Memory), and a RAM. The ROM may hold, for example, programs. The RAM may serve as a work area. The central controller 154 may control, for example, the I/F 150 and the data storage 152 through a system bus 156. In this embodiment, the central controller 154 may include an image acquisition unit 160, a distance image generation unit 162, a three-dimensional (3D) object identification unit 163, a first width derivation unit 164, a second width derivation unit 166, a degree-of-overlap derivation unit 168, and a specific object determination unit 170. In the following, a vehicle exterior environment recognition method according to the embodiment is described in detail, together with operation of the subunits of the central controller 154. The vehicle exterior environment recognition method includes extracting three-dimensional objects ahead of the own vehicle 1 and identifying a specific object such as a preceding vehicle.

(Vehicle Exterior Environment Recognition Method)

Figure 3:
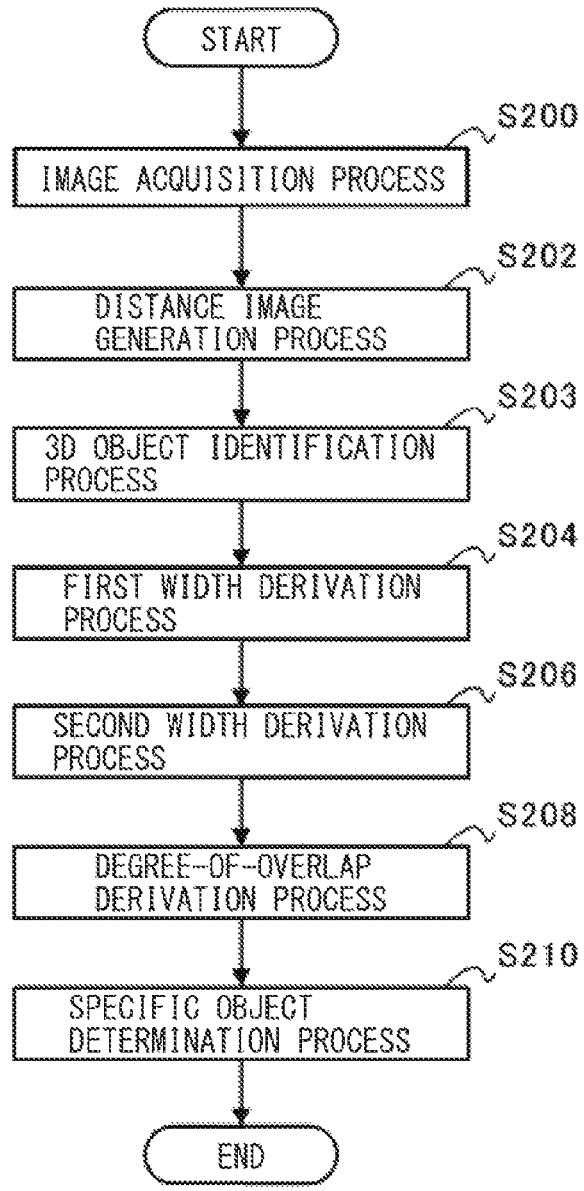
FIG. 3 is a flowchart illustrating a flow of a vehicle exterior environment recognition method.

FIG. 3 is a flowchart illustrating a flow of the vehicle exterior environment recognition method. The vehicle exterior environment recognition apparatus 120 may execute the vehicle exterior environment recognition method on cycles of predetermined interrupt time. In the vehicle exterior environment recognition method, first, the image acquisition unit 160 may acquire a plurality of the luminance images (S200). The distance image generation unit 162 may generate the distance image (S202). The three-dimensional object identification unit 163 may identify a three-dimensional object (S203). The first width derivation unit 164 may derive a first width of a first three-dimensional object on the basis of the luminance image (S204). The luminance image is configured to identify luminance of a target of imaging. The second width derivation unit 166 may derive a second width of a second three-dimensional object on the basis of the distance image (S206). The distance image is configured to identify a distance to the target of imaging. The degree-of-overlap derivation unit 168 may obtain an overlap width. The overlap width is a width of a region where the first width and the second width overlap in a horizontal direction of the image. The degree-of-overlap derivation unit 168 may set, as a degree of overlap, whichever is greater out of a value obtained by dividing the overlap width by the first width and a value obtained by dividing the overlap width by the second width (S208). In a case where the degree of overlap is greater than a predetermined threshold, the specific object determination unit 170 may determine that the first three-dimensional object and the second three-dimensional object are an identical specific object (S210). In the following, each process of the vehicle exterior environment recognition method is described in detail, and description of processes irrelevant to this embodiment is omitted. It is to be noted that in this embodiment, the sign "/" indicates division. For example, "the overlap width/the first width" indicates dividing the overlap width by the first width.

(Image Acquisition Process S200)

Figure 4A:
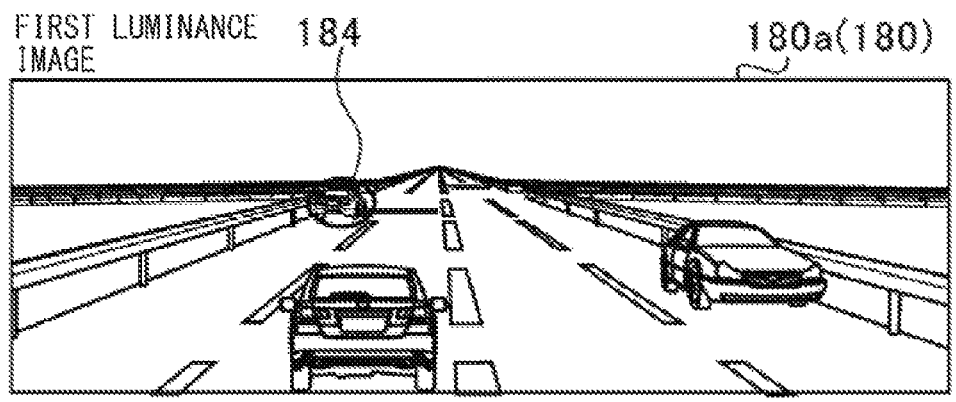
FIGS. 4A, 4B, and 4C describe examples of a first luminance image, a second luminance image, and a distance image, respectively.
Figure 4B:
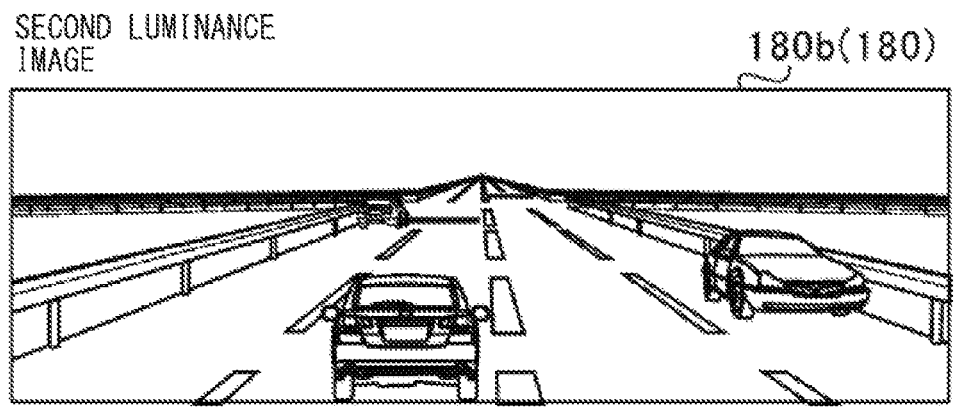
Figure 4C:
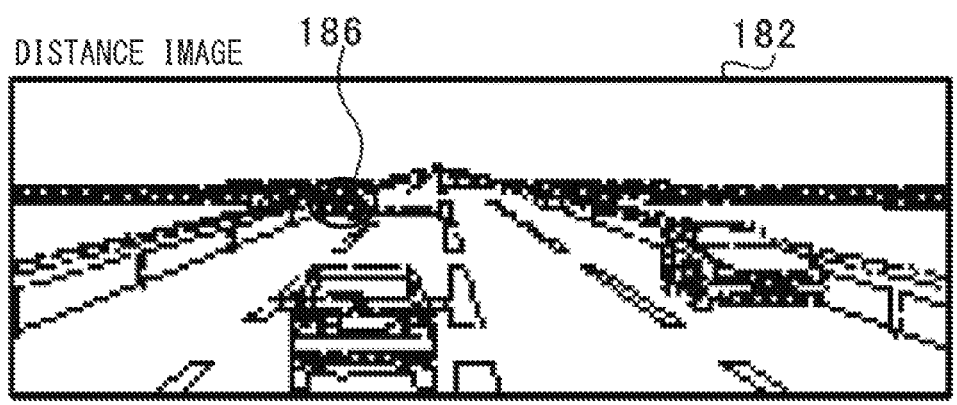

FIGS. 4A to 4C illustrate examples of the luminance images and the distance image. The image acquisition unit 160 acquires the plurality of the luminance images, e.g., the two luminance images in this embodiment. The plurality of the luminance images is captured by the image-capturing units 110 having differently-oriented optical axes. Let us assume that the image acquisition unit 160 acquires a first luminance image 180a as illustrated in FIG. 4A and a second luminance image 180b as illustrated in FIG. 4B. The first luminance image 180a may be captured by the image-capturing unit 110 located on the relatively right side of the own vehicle 1. The second luminance image 180b may be captured by the image-capturing unit 110 located on the relatively left side of the own vehicle 1.

Referring to FIGS. 4A and 4B, the first luminance image 180a and the second luminance image 180b differ in horizontal image positions of a three-dimensional object included therein. Such a difference is caused by a difference in imaging positions at which the image-capturing units 110 capture images. The term horizontal refers to a transverse direction in an image captured. The term vertical refers to a longitudinal direction in the image captured.

(Distance Image Generation Process S202)

The distance image generation unit 162 may generate a distance image 182 as illustrated in FIG. 4C, on the basis of the first luminance image 180a illustrated in FIG. 4A and the second luminance image 180b illustrated in FIG. 4B. The distance image 182 is configured to identify the distance to the target of imaging. The first luminance image 180a and the second luminance image 180b may be acquired by the image acquisition unit 160.

In one example, the distance image generation unit 162 may derive parallax information with the use of so-called pattern matching. The parallax information includes parallax, and an image position indicating where any block is positioned in an image. For example, the distance image generation unit 162 may search one of the luminance images, e.g., the second luminance image 180b, for a corresponding block to any block extracted from another of the luminance images, e.g., the first luminance image 180a. A block is represented by, for example, an array of 4 pixels horizontally by 4 pixels vertically. The pattern matching is a technique including searching one of the luminance images for a corresponding block to any block extracted from another of the luminance images.

Non-limiting examples of a function for evaluation of a degree of matching of blocks in the pattern matching may include techniques such as, but not limited to, SAD (Sum of Absolute Difference), SSD (Sum of Squared Difference), and NCC (Normalized Cross Correlation). The SAD includes obtaining a difference in the luminance. The SSD includes using the difference squared. The NCC includes obtaining a degree of similarity of a variance obtained by subtracting an average from luminance of each pixel.

The distance image generation unit 162 may perform such parallax derivation processing in units of blocks with respect to all blocks displayed in the detection region of, for example, 600 pixels by 200 pixels. Here, each block is assumed to include 4 pixels by 4 pixels, but the number of pixels in each block may be set at any value.

The distance image generation unit 162 is configured to derive the parallax with respect to each block as a unit of resolution of detection, but is not configured to recognize what three-dimensional object the relevant block is a part of. It follows, therefore, that the parallax information is derived not in units of three-dimensional objects but in units of the resolution of detection in the detection region, e.g., independently in units of blocks. In FIG. 4C, for purposes of description, the block with respect to which the parallax is derived is represented by a black dot.

The distance image generation unit 162 is configured to convert the parallax information in units of blocks in the distance image 182 into three-dimensional positional information with the use of a so-called stereo method, to derive a relative distance. The stereo method is a method of deriving, from parallax of a block, a relative distance to the image-capturing units 110 of the relevant block with the use of triangulation.

The vehicle exterior environment recognition apparatus 120 may recognize the vehicle exterior environment on the basis of the luminance images 180 and the distance image 182 thus derived, and determine that, for example, a three-dimensional object ahead of the own vehicle 1 is a specific object such as a preceding vehicle. However, there may be a case where the three-dimensional object 184 in FIG. 4A and the three-dimensional object 186 in FIG. 4C is located far away from the own vehicle 1. In such a case, the three-dimensional object itself occupies small area in the image. This may cause fluctuation of the shape in the luminance images 180, or fluctuation of the relative distance in the distance image 182, resulting in lowered determination accuracy of the specific object. Thus, this embodiment includes deriving the degree of overlap. The degree of overlap is a degree at which the three-dimensional objects identified in the luminance images 180 and the distance image 182 overlap. In accordance with the degree of overlap, a determination is made as to whether or not the three-dimensional objects are an identical specific object.

(Three-Dimensional Object Identification Process S203)

First, the three-dimensional object identification unit 163 may identify a road surface ahead of the own vehicle 1. The three-dimensional object identification unit 163 may identify a three-dimensional object having a height vertically upward from the road surface identified. In one example, the three-dimensional object identification unit 163 may assume blocks located at a predetermined height, e.g., 0.3 meter, or greater from the road surface, as a presumed three-dimensional object protruding heightwise from the road surface. The three-dimensional object identification unit 163 may perform grouping of whichever blocks have the same relative distance to the own vehicle 1, out of the plurality of the blocks assumed to be the presumed three-dimensional object having the height vertically upward from the road surface. Thus, the three-dimensional object identification unit 163 may identify the blocks thus grouped, as a three-dimensional object.

(First Width Derivation Process S204)

The first width derivation unit 164 may derive a first width. The first width is a horizontal width of a three-dimensional object 184 in either one of the two luminance images 180, e.g., the first luminance image 180a. The first width may be represented by, for example, a converted value of the number of pixels or a distance. In one embodiment of the disclosure, the three-dimensional object 184 may serve as a "first three-dimensional object".

It is to be noted that in extracting a three-dimensional object from the luminance images 180, machine learning techniques may be used. For example, edge patterns and time changes in the luminance images 180 are supplied as an input, to output a three-dimensional object considered to be formed as a unity. As to such machine learning techniques, existing various techniques may be employed, and detailed description thereof is omitted.

(Second Width Derivation Process S206)

The second width derivation unit 166 may derive a second width. The second width is a horizontal width of a predetermined three-dimensional object 186 in the distance image 182. The second width may be represented by, for example, a converted value of the number of pixels or a distance. In one embodiment of the disclosure, the three-dimensional object 186 may serve as a "second three-dimensional object".

In this example, both the first width derivation unit 164 and the second width derivation unit 166 may derive the horizontal widths of the three-dimensional objects 184 and 186. One reason may be as follows. The own vehicle 1 may possibly swing in a pitch direction and a roll direction, because of unevenness of a road. Meanwhile, in a yaw direction, such swinging is not as likely as in the pitch direction and the roll direction. Accordingly, targeting the horizontal width corresponding to the stable yaw direction makes it possible to enhance the determination accuracy of the specific object. It is to be noted that on a flat road, a vertical width corresponding to the pitch direction may be targeted instead of, or in addition to, the horizontal width corresponding to the yaw direction.

(Degree-of-Overlap Derivation Process S208)

FIGS. 5A to 5F illustrate examples of the degree of overlap. First, the degree-of-overlap derivation unit 168 may acquire the first width 190 derived by the first width derivation unit 164 and the second width 192 derived by the second width derivation unit 166. The degree-of-overlap derivation unit 168 may derive an overlap width 194. The overlap width 194 is a width of a region where the first width and the second width overlap in the horizontal direction of the images.

Figure 5A:
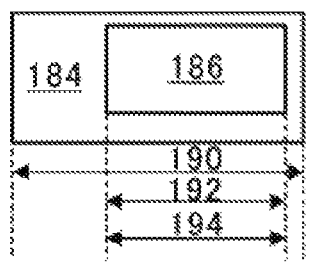
FIGS. 5A to 5F describe examples of a degree of overlap.
Figure 5B:
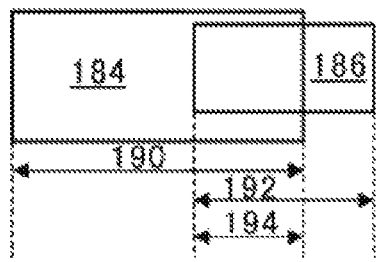
Figure 5C:
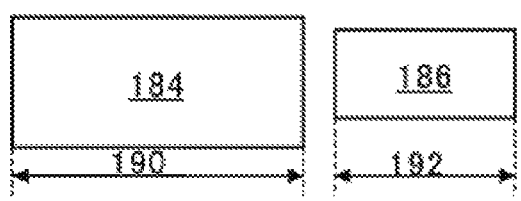

In FIGS. 5A to 5C, the first width 190 of the three-dimensional object 184 is greater than the second width 192 of the three-dimensional object 186. In FIG. 5A, the three-dimensional object 186 is included in the horizontal direction in the three-dimensional object 184. Accordingly, the overlap width 194 is equal to the second width 192. In FIG. 5B, the three-dimensional object 184 and the three-dimensional object 186 overlap in the horizontal direction. Accordingly, the overlap width 194 is smaller than the first width 190 and the second width 192. In FIG. 5C, the three-dimensional object 184 and the three-dimensional object 186 do not overlap in the horizontal direction. Accordingly, the overlap width 194 is zero (0).

Figure 5D:
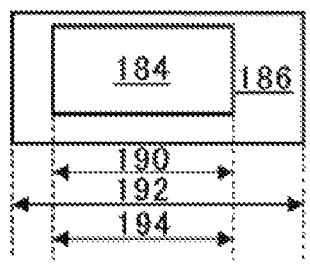
Figure 5E:
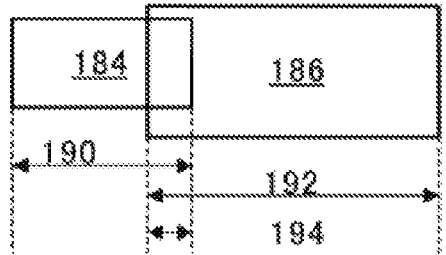
Figure 5F:
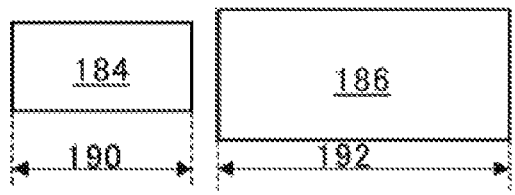

In FIGS. 5D to 5F, the first width 190 of the three-dimensional object 184 is smaller than the second width 192 of the three-dimensional object 186. In FIG. 5D, the three-dimensional object 184 is included in the horizontal direction in the three-dimensional object 186. Accordingly, the overlap width 194 is equal to the first width 190. In FIG. 5E, the three-dimensional object 184 and the three-dimensional object 186 overlap in the horizontal direction. Accordingly, the overlap width 194 is smaller than the first width 190 and the second width 192. In FIG. 5F, the three-dimensional object 184 and the three-dimensional object 186 do not overlap in the horizontal direction. Accordingly, the overlap width 194 is zero (0).

Thereafter, in a case where the overlap width 194 takes a value other than zero (0), i.e., in a case where the degree-of-overlap derivation unit 168 determines that the three-dimensional objects 184 and 186 at least overlap, the degree-of-overlap derivation unit 168 may derive a value obtained by dividing the overlap width 194 by the first width 190 (the overlap width 194/the first width 190) and a value obtained by dividing the overlap width 194 by the second width 192 (the overlap width 194/the second width 192). The degree-of-overlap derivation unit 168 may set, as the degree of overlap, whichever is greater out of the value obtained by dividing the overlap width 194 by the first width 190 (the overlap width 194/the first width 190) and the value obtained by dividing the overlap width 194 by the second width 192 (the overlap width 194/the second width 192).

In the example of FIG. 5A, the value obtained by dividing the overlap width 194 by the first width 190 is smaller than the value obtained by dividing the overlap width 194 by the second width 192 ((the overlap width 194/the first width 190)<(the overlap width 194/the second width 192)). Accordingly, the degree of overlap is the value obtained by dividing the overlap width 194 by the second width 192 (the overlap width 194/the second width 192), which is equal to 1 (=1). In the example of FIG. 5B, the value obtained by dividing the overlap width 194 by the first width 190 is smaller than the value obtained by dividing the overlap width 194 by the second width 192 ((the overlap width 194/the first width 190)<(the overlap width 194/the second width 192)). Accordingly, the degree of overlap is the value obtained by dividing the overlap width 194 by the second width 192 (the overlap width 194/the second width 192). In the example of FIG. 5C, the overlap width 194 is zero (0), i.e., the three-dimensional objects 184 and 186 do not overlap. Accordingly, the degree of overlap is also zero (0).

In the example of FIG. 5D, the value obtained by dividing the overlap width 194 by the first width 190 is greater than the value obtained by dividing the overlap width 194 by the second width 192 ((the overlap width 194/the first width 190)>(the overlap width 194/the second width 192)). Accordingly, the degree of overlap is the value obtained by dividing the overlap width 194 by the first width 190 (the overlap width 194/the first width 190), which is equal to 1 (=1). In the example of FIG. 5E, the value obtained by dividing the overlap width 194 by the first width 190 is greater than the value obtained by dividing the overlap width 194 by the second width 192 ((the overlap width 194/the first width 190)>(the overlap width 194/the second width 192)). Accordingly, the degree of overlap is the value obtained by dividing the overlap width 194 by the first width 190 (the overlap width 194/the first width 190). In the example of FIG. 5F, the overlap width 194 is zero (0), i.e., the three-dimensional objects 184 and 186 do not overlap. Accordingly, the degree of overlap is also zero (0).

(Specific Object Determination Process S210)

The specific object determination unit 170 may refer to a threshold, and determine whether or not the three-dimensional object 184 and the three-dimensional object 186 are an identical specific object.

Figure 6:
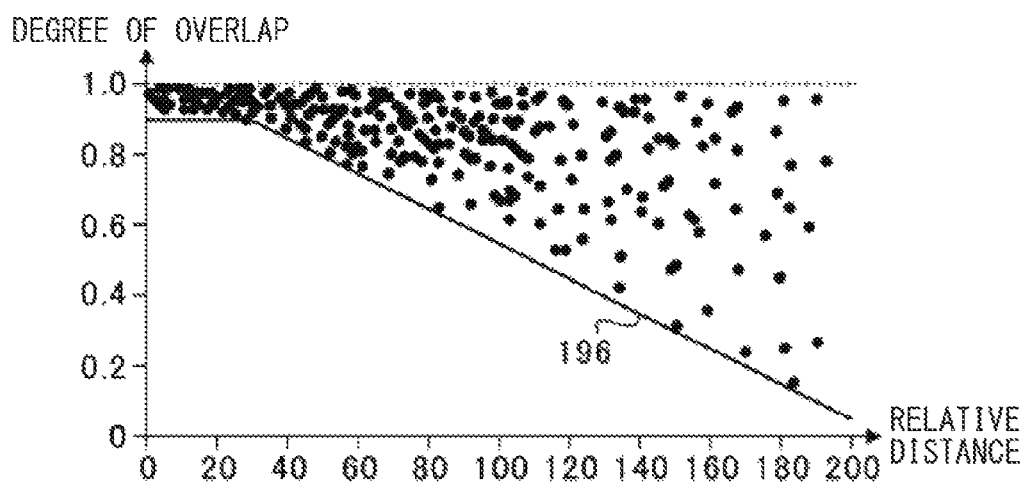
FIG. 6 is a graph that describes how to obtain a threshold to be referred to in a specific object determination unit.

FIG. 6 is a graph that describes how to obtain the threshold to be referred to in the specific object determination unit 170. In the graph of FIG. 6, a horizontal axis denotes the relative distance, and a vertical axis denotes the degree of overlap. Here, the degree of overlap is represented in a range from zero (0) to 1 both inclusive. Such a graph of the degree of overlap may be prepared in advance.

For example, for preparation, the own vehicle 1 may travel in a predetermined region, extract a plurality of three-dimensional objects during the travel, identify whichever three-dimensional object corresponds to a vehicle out of the plurality of the three-dimensional objects extracted, and plot actual measured values of the relative distance and the degree of overlap. In this way, a group of points in FIG. 6 is obtained. It is understood here that as the relative distance becomes longer, the degree of overlap takes a smaller value. In FIG. 6, a straight line is generated that is equal to or lower than lowest values of the group of the points with respect to any value of the relative distance. Such a straight line represents a threshold 196. Accordingly, the threshold 196 may be represented by a linear function of the relative distance. It is to be noted that insofar as the threshold 196 is equal to or lower than the lowest values of the group of the points with respect to any value of the relative distance, the threshold 196 is not limited to a straight line, but may be represented by a curve, i.e., a quadratic or higher order function. It is to be noted that description is made here by giving the example where the own vehicle 1 itself makes the plotting of the actual measured values of the relative distance and the degree of overlap, but this is non-limiting. For example, the actual measured values of the relative distance and the degree of overlap plotted by other vehicles may be used by the own vehicle 1.

The specific object determination unit 170 may refer to the threshold 196 prepared in this way, and determine that the three-dimensional object 184 and the three-dimensional object 186 are an identical specific object, in a case where the degree of overlap between the three-dimensional object 184 and the three-dimensional object 186 at the relative distance where the three-dimensional object 184 and the three-dimensional object 186 are located is equal to or higher than the threshold 196. The degree of overlap may be derived by the degree-of-overlap derivation unit 168.

In this example, to determine strictly that the three-dimensional object 184 and the three-dimensional object 186 are the identical specific object, a great value is adopted as the threshold 196. It is unnecessary, however, to keep the threshold 196 at the great value, after the three-dimensional object 184 and the three-dimensional object 186 are determined as being the identical specific object. Accordingly, a hysteresis characteristic may be introduced, making it possible to keep on determining, once the three-dimensional object 184 and the three-dimensional object 186 are determined as being the identical specific object, that the three-dimensional object 184 and the three-dimensional object 186 are the identical specific object, even in a case where the degree of overlap lowers to a certain extent.

Figure 7:
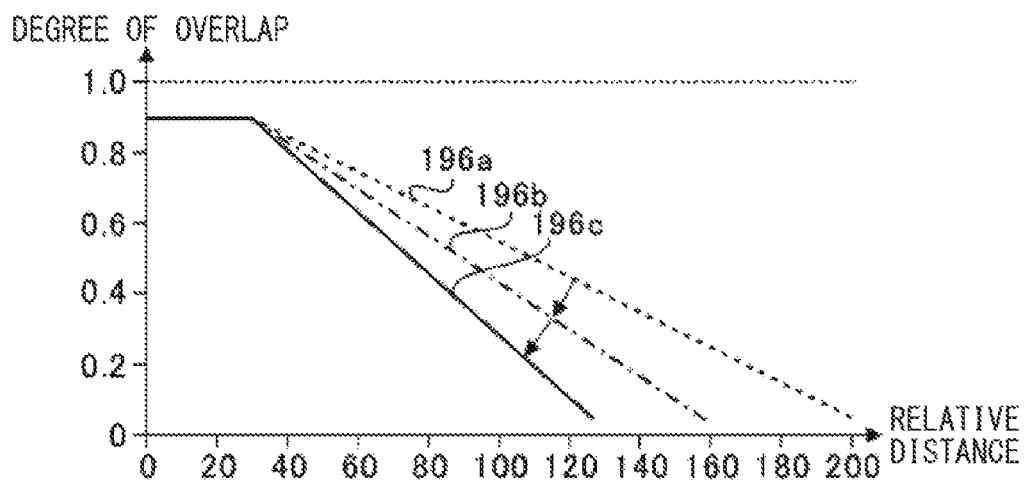
FIG. 7 describes how the threshold changes.
Figure 8:
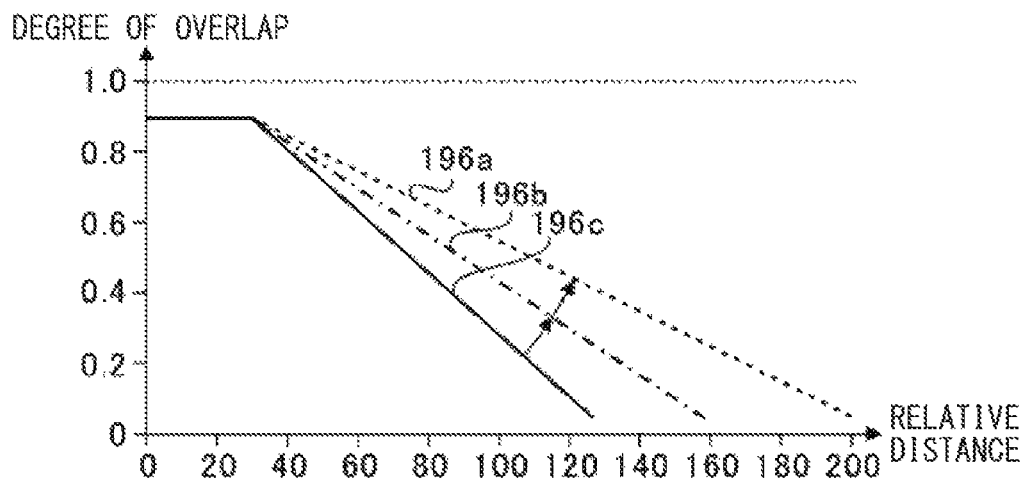
FIG. 8 describes how the threshold changes.

FIGS. 7 and 8 describe how the threshold 196 changes. In one example, in the case where the specific object determination unit 170 determines that the three-dimensional object 184 and the three-dimensional object 186 are the identical specific object, the specific object determination unit 170 may lower the threshold 196 to be compared to the degree of overlap between the three-dimensional object 184 and the three-dimensional object 186, from a threshold 196a denoted by a broken line in FIG. 7 to a threshold 196b denoted by an alternate long and short dashed line.

Thus, even in a case where the degree of overlap between the three-dimensional object 184 and the three-dimensional object 186 determined as being the identical specific object fluctuates near the threshold 196a, the degree of overlap becomes at least equal to or greater than the threshold 196b. This makes it easier for the three-dimensional object 184 and the three-dimensional object 186 to be determined continuously thereafter as being the identical specific object. Hence, it is possible to determine the specific object stably.

The specific object determination unit 170 may count the number of times the three-dimensional object 184 and the three-dimensional object 186 are determined consecutively as being the identical specific object. The specific object determination unit 170 may lower stepwise the threshold 196 for the degree of overlap, in accordance with the number of times the three-dimensional object 184 and the three-dimensional object 186 are determined as being the identical specific object. For example, the specific object determination unit 170 may prepare, in advance, a plurality of discrete values for the threshold 196, e.g., a threshold 196a indicated by a broken line in FIG. 7, a threshold 196b indicated by an alternate long and short dashed line, and a threshold 196c indicated by a solid line. Thus, the specific object determination unit 170 may lower stepwise the threshold 196 from the threshold 196a to the threshold 196b, and from the threshold 196b to the threshold 196c.

In one example, upon consecutively determining the predetermined number of times, e.g., 10 times, with the threshold 196a, that the three-dimensional object 184 and the three-dimensional object 186 are the identical specific object, the specific object determination unit 170 may lower the threshold 196 for the degree of overlap between the three-dimensional object 184 and the three-dimensional object 186 determined as being the identical specific object, for example, from the threshold 196a to the threshold 196b in FIG. 7. Moreover, upon consecutively determining the predetermined number of times, e.g., 10 times, with the threshold 196b, that the three-dimensional object 184 and the three-dimensional object 186 are the identical specific object, the specific object determination unit 170 may lower the threshold 196 for the degree of overlap between the three-dimensional object 184 and the three-dimensional object 186 determined as being the identical specific object, for example, from the threshold 196b to the threshold 196c in FIG. 7.

Thus, in the case where the three-dimensional object 184 and the three-dimensional object 186 are determined as being the identical specific object, the threshold 196 may be lowered stepwise. This makes it easier for the three-dimensional object 184 and the three-dimensional object 186 to be determined continuously thereafter as being the identical specific object. Hence, it is possible to determine the specific object more stably.

In a case where the threshold 196 has been lowered, but the degree of overlap becomes lower than the threshold 196, causing the three-dimensional object 184 and the three-dimensional object 186 to be determined as not being the identical specific object, the threshold 196 should no longer be maintained. Thus, the hysteresis characteristic may be also provided in the case where the three-dimensional object 184 and the three-dimensional object 186 are determined as not being the identical specific object. Once the three-dimensional object 184 and the three-dimensional object 186 are determined as not being the identical specific object, and the degree of overlap does not increase, the three-dimensional object 184 and the three-dimensional object 186 are not determined as being the identical specific object.

In one example, in a case where the threshold 196 is the threshold 196c indicated by the solid line in FIG. 8, and the specific object determination unit 170 determines that the three-dimensional object 184 and the three-dimensional object 186 are not the identical specific object, the specific object determination unit 170 may raise the threshold 196 for the comparison to the degree of overlap between the three-dimensional object 184 and the three-dimensional object 186, for example, from the threshold 196c to the threshold 196b indicated by an alternate long and short dashed line in FIG. 8.

Thus, even in the case where the degree of overlap between the three-dimensional object 184 and the three-dimensional object 186 determined as not being the identical specific object becomes higher than the threshold 196c, it becomes difficult for the three-dimensional object 184 and the three-dimensional object 186 to be determined as being the identical specific object until the degree of overlap becomes at least equal to or higher than the threshold 196b. Hence, it is possible to stably eliminate a three-dimensional object that is not a specific object.

The specific object determination unit 170 may raise stepwise the threshold 196 for the degree of overlap, in accordance with the number of times the three-dimensional object 184 and the three-dimensional object 186 are determined as not being the identical specific object. For example, the specific object determination unit 170 may raise the threshold 196 from the threshold 196*c* indicated by the solid line in FIG. 8 to the threshold 196*b* indicated by the alternate long and short dashed line, and from the threshold 196*b* to the threshold 196*a* indicated by a broken line.

Upon consecutively determining the predetermined number of times, e.g., 10 times, with the threshold 196*c*, that the three-dimensional object 184 and the three-dimensional object 186 used to be determined as being the identical specific object are not the identical specific object, the specific object determination unit 170 may raise the threshold 196 for the degree of overlap between the three-dimensional object 184 and the three-dimensional object 186 used to be determined as being the identical specific object, for example, from the threshold 196*c* to the threshold 196*b* in FIG. 8. Moreover, upon consecutively determining the predetermined number of times, e.g., 10 times, with the threshold 196*b*, that the three-dimensional object 184 and the three-dimensional object 186 are not the identical specific object, the specific object determination unit 170 may raise the threshold 196 for the degree of overlap between the three-dimensional object 184 and the three-dimensional object 186 used to be determined as being the identical specific object, for example, from the threshold 196*b* to the threshold 196*a* in FIG. 8.

Thus, in the case where the three-dimensional object 184 and the three-dimensional object 186 used to be determined as being the identical specific object are determined as not being the identical specific object, the threshold 196 may be raised stepwise, making it difficult for the three-dimensional object 184 and the three-dimensional object 186 to be determined thereafter as being the identical specific object. Hence, it is possible to eliminate more stably the three-dimensional object that is not the specific object.

On travel in the rainfall, raindrops attach to, for example, the front windshield glass or lenses in front of the image-capturing units 110. This may sometimes cause blur of the luminance images 180 and the distance image 182. In this case, the degree of overlap between the three-dimensional object 184 and the three-dimensional object 186 may be lower than a true value, resulting in possibility that the specific object determination unit 170 determines that the three-dimensional object 184 and the three-dimensional object 186 that should be determined as being the identical specific object are not the identical specific object. Thus, in a case where attachment of raindrops is assumed, e.g., in a case where the wiper 148 is in operation, the specific object determination unit 170 may lower the threshold 196 to a lower value than in a case where the wiper 148 is out of operation. With such a configuration, it is possible to appropriately determine the specific object even on the travel in the rainfall.

Moreover, in a case where the speed of the own vehicle 1 is high, determining appropriately the preceding vehicle as a distant specific object is even more important. Meanwhile, in a case where the speed of the own vehicle 1 is low, determining the preceding vehicle reliably is not as important as is the case where the speed of the own vehicle 1 is high. Thus, the specific object determination unit 170 may change the threshold 196 in accordance with the speed of the own vehicle 1. For example, in a case where the speed of the own vehicle 1 detected by the speed sensor 138 is high, the threshold 196 may be raised as compared to a case where the speed is low. In a case where the speed of the own vehicle 1 is low, the threshold 196 may be lowered as compared to the case where the speed is high. The threshold 196 may be changed linearly in proportion to the speed of the own vehicle 1, or alternatively, the threshold 196 may be changed stepwise. In this way, it is possible to appropriately determine the specific object regardless of the speed of the own vehicle 1.

The specific object determination unit 170 may identify which specific object the identical specific object having the degree of overlap equal to or higher than the predetermined threshold is. For example, first, the specific object determination unit 170 may perform grouping of whichever blocks in the distance image 182 have the same relative distance to the own vehicle 1 and are close to one another with respect to distances in the vertical and horizontal directions, out of the blocks located at the predetermined height or greater from the road surface. The specific object determination unit 170 may assume the blocks thus grouped to be, for example, a presumed preceding vehicle. Thereafter, the specific object determination unit 170 may identify, as a three-dimensional object region, a rectangular region in the first luminance image 180*a* including an entirety of the three-dimensional object thus identified. Here, a rectangle includes two straight lines extending in the vertical direction and in contact with left and right edges of the three-dimensional object, and two straight lines extending in the horizontal direction and in contact with upper and lower edges of the three-dimensional object.

The specific object determination unit 170 may identify the specific object included in the three-dimensional object region thus formed, as a preceding vehicle, on the basis of various conditions indicating vehicle-likeliness. Thus, in a case where the three-dimensional object region is identified as the preceding vehicle, the vehicle exterior environment recognition apparatus 120 may carry out a control to reduce damages by a collision with the preceding vehicle and/or to keep a safe inter-vehicular distance to the preceding vehicle.

The specific object determination unit 170 may store, in the data storage 152, the positions and the speeds of the three-dimensional object 184 and the three-dimensional object 186 determined as being the identical specific object. Thus, the specific object determination unit 170 may track the three-dimensional object 184 and the three-dimensional object 186 on the basis of the positions and the speeds. This makes it possible for the specific object determination unit 170 to identify the three-dimensional object 184 and the three-dimensional object 186 determined as being the identical specific object in the previous frame.

As described, in this embodiment, with the use of the luminance images and the distance image, the determination is made as to whether the three-dimensional objects in the luminance images and the distance image are the identical specific object, in accordance with the degree of overlap between the three-dimensional objects in the luminance images and the distance image. With this configuration, it is possible to enhance the determination accuracy of the specific object.

There are also provided a program that causes a computer to serve as the vehicle exterior environment recognition apparatus 120, and a computer-readable recording medium that holds the program. Non-limiting examples of the recording medium may include a flexible disk, a magneto-optical disk, a ROM, a CD (compact disk), a DVD (digital versatile disk), and a BD (blue ray disk). Here, the program means a data processor described in any language or description method.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, the forgoing embodiments are described by giving the example of the determination regarding the preceding vehicle as the specific object ahead of the own vehicle 1, in particular, the specific object located far away. However, this is non-limiting. It should be appreciated that the technology is applicable to a case with a nearby specific object.

For example, in the forgoing embodiments, the example is given in which the two luminance images 180 captured by the two image-capturing units 110 are used. In this example, the first luminance image 180a as one of the two luminance images 180, and the distance image 182 based on the two luminance images 180 are employed. However, this is non-limiting. The luminance images 180 and the distance image 182 may be independently acquired. For example, the luminance images 180 may be captured by one of three image-capturing units 110, while the distance image 182 may be derived from the luminance images 180 captured by two of the three image-capturing units 110.

It is to be noted that processes of the vehicle exterior environment recognition method herein do not have to be processed in the order described in the flowchart, but may include parallel processing or sub-routine processing.

The vehicle exterior environment recognition apparatus 120 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle exterior environment recognition apparatus 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle exterior environment recognition apparatus 120 illustrated in FIG. 1.

The invention claimed is:

1. A vehicle exterior environment recognition apparatus comprising:
    a first width derivation unit configured to derive a first width of a first object on a basis of a luminance image, the luminance image being configured to identify luminance of a target of imaging;
    a second width derivation unit configured to derive a second width of a second object on a basis of a distance image, the distance image being different from the luminance image and configured to identify a distance to the target of imaging;
    a degree-of-overlap derivation unit configured to obtain an overlap width with which the first width and the second width overlap in a horizontal direction, and set, as a degree of overlap, whichever is greater out of a value obtained by dividing the overlap width by the first width and a value obtained by dividing the overlap width by the second width; and
    an object determination unit configured to determine that the first object and the second object are an identical object, when the degree of overlap is greater than a threshold,
    wherein the object determination unit is further configured to lower the threshold for the degree of overlap with which the object determination unit has determined that the first object and the second object are the identical object.

2. The vehicle exterior environment recognition apparatus according to claim 1, wherein after lowering the threshold for the degree of overlap, the object determination unit is configured to raise the threshold for the degree of overlap with which the object determination unit has determined that the first object and the second object are not the identical object.

3. The vehicle exterior environment recognition apparatus according to claim 2, wherein the object determination unit is configured to change the threshold in accordance with a speed of an own vehicle.

4. The vehicle exterior environment recognition apparatus according to claim 2, wherein the object determination unit is configured to change the threshold in accordance with whether or not a wiper is in operation.

5. The vehicle exterior environment recognition apparatus according to claim 2, wherein the object determination unit is configured to change stepwise the threshold for the degree of overlap, in accordance with the number of times the object determination unit has determined that the first object and the second object are the identical object.

6. The vehicle exterior environment recognition apparatus according to claim 5, wherein the object determination unit is configured to change the threshold in accordance with whether or not a wiper is in operation.

7. The vehicle exterior environment recognition apparatus according to claim 5, wherein the object determination unit is configured to change the threshold in accordance with a speed of an own vehicle.

8. The vehicle exterior environment recognition apparatus according to claim 1, wherein the object determination unit is configured to change stepwise the threshold for the degree of overlap, in accordance with the number of times the object determination unit has determined that the first object and the second object are the identical object.

9. The vehicle exterior environment recognition apparatus according to claim 8, wherein the object determination unit is configured to change the threshold in accordance with whether or not a wiper is in operation.

10. The vehicle exterior environment recognition apparatus according to claim 8, wherein the object determination unit is configured to change the threshold in accordance with a speed of an own vehicle.

11. The vehicle exterior environment recognition apparatus according to claim 1, wherein the object determination unit is configured to change the threshold in accordance with whether or not a wiper is in operation.

12. The vehicle exterior environment recognition apparatus according to claim 1, wherein the object determination unit is configured to change the threshold in accordance with a speed of an own vehicle.

13. A vehicle exterior environment recognition apparatus comprising
circuitry configured to:
derive a first width of a first object on a basis of a luminance image, the luminance image being configured to identify luminance of a target of imaging;
derive a second width of a second object on a basis of a distance image, the distance image being configured to identify a distance to the target of imaging;
obtain an overlap width with which the first width and the second width overlap in a horizontal direction, and set, as a degree of overlap, whichever is greater out of a value obtained by dividing the overlap width by the first width and a value obtained by dividing the overlap width by the second width;
determine that the first object and the second object are an identical object when the degree of overlap is greater than a threshold; and
wherein the circuitry is further configured to lower the threshold for the degree of overlap with which the object determination unit has determined that the first object and the second object are the identical object.

* * * * *